United States Patent [19]
Fell et al.

[11] 3,732,740
[45] May 15, 1973

[54] GEAR TRANSMISSION HAVING MECHANISM FOR REVERSE GRINDING

[75] Inventors: Ferol S. Fell, Newton; William D. Long, Hesston, both of Kans.

[73] Assignee: Hesston Corporation, Hesston, Kans.

[22] Filed: Dec. 8, 1971

[21] Appl. No.: 206,028

[52] U.S. Cl..................................74/15.2, 74/15.4
[51] Int. Cl.........................................F16h 37/06
[58] Field of Search...........................74/15.2, 15.4

[56] References Cited

UNITED STATES PATENTS 2,877,664  8/1959  West.............................74/15.2 X
3,389,609  6/1968  Luscombe..........................74/15.2

Primary Examiner—Leonard H. Gerin
Attorney—Schmidt, Johnson, Hovey & Williams

[57] ABSTRACT

During the sharpening of the cutter blades of a crop chopping rotor of a farm implement the rotor is rotated in reverse from the input shaft of a reversible transmission having a number of output shafts operably connected with certain components of the implement. Normally, the rotor is driven from a power shaft through a releasable coupling and the input shaft is rotated through a drive from the rotor shaft. Upon release of the coupling, connection of the power shaft with one of the output shafts and reversal of the transmission, the drive between the input shaft and the rotor shaft effects rotor reversal.

9 Claims, 7 Drawing Figures

PATENTED MAY 15 1973

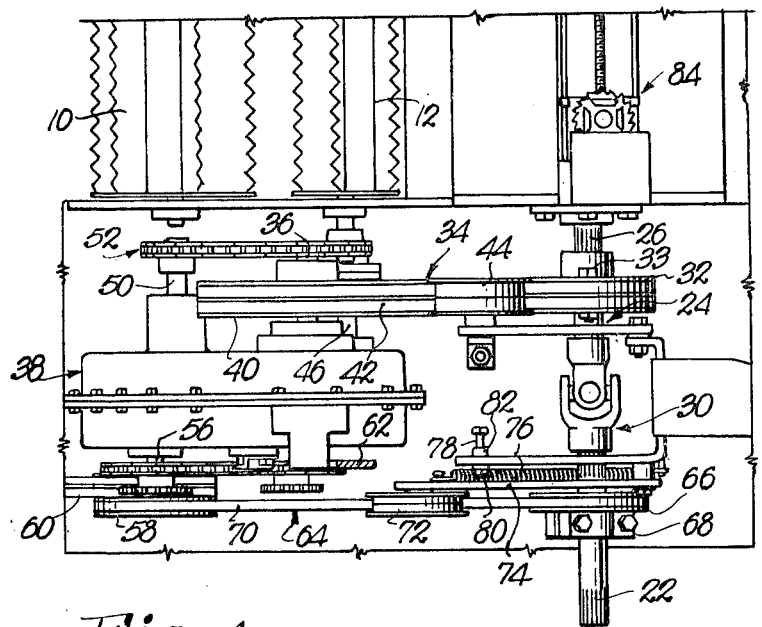
Fig. 4.
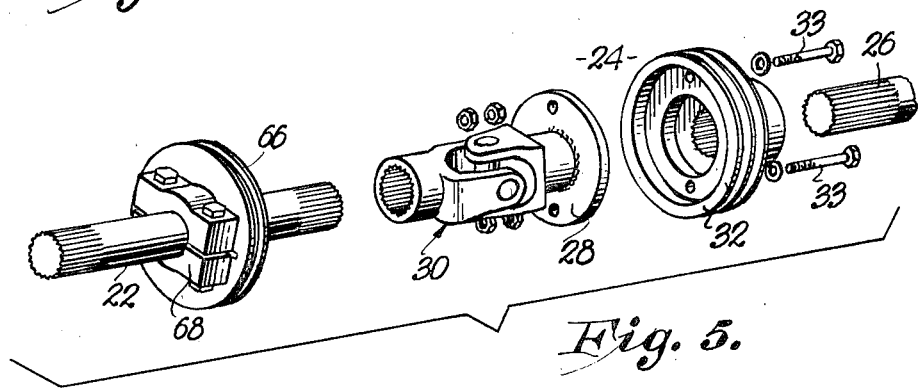
Fig. 5.
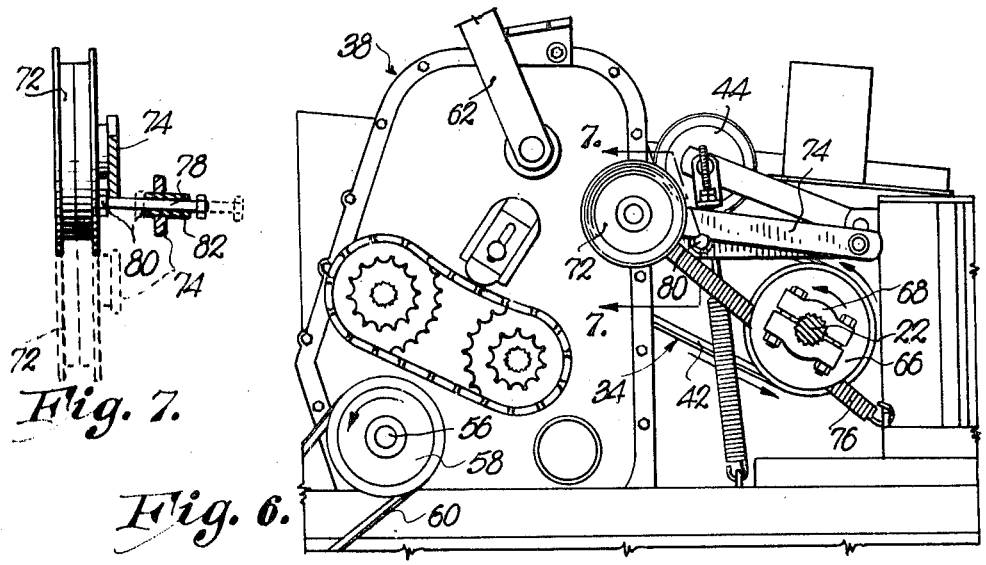
Fig. 7.
Fig. 6.

GEAR TRANSMISSION HAVING MECHANISM FOR REVERSE GRINDING

An important object of the present invention is to provide for reversal of a crop chopping rotor of a farm implement during sharpening of the chopping blades of the rotor through use of the power shaft and the reversible transmission employed to drive the component parts of the implement during normal operation.

Another important object of the instant invention is to effect chopping rotor reversal for the purpose of sharpening its chopping blades without need to reverse the power shaft notwithstanding the direct connection of the rotor shaft and the power shaft during normal operation.

A further object of our present invention is to provide for an arrangement which permits the use of the reversible transmission of the implement to rotate the rotor in reverse despite the fact that during normal operation the rotor has a direct, unidirectional drive from the power shaft rather than from the transmission.

A still further object of our instant invention is the provision of a way to drive an output shaft of a reversible transmission directly from a power shaft during sharpening such that the input shaft of the transmission drives the rotor shaft in reverse.

Yet another object of the present invention is to provide for rotor reversing through use of a simple coupling release and a direct connection between the power shaft and an output shaft of the transmission, all of which may be quickly and easily carried out preparatory to sharpening without need for any change whatever in the connections between the transmission and the many components of the implement driven thereby.

In the drawings:

FIG. 4 is a fragmentary plan view of the transmission and the feeder rolls as shown in FIGS. 1–3;

FIG. 5 is an exploded perspective view of the power shaft, rotor shaft and releasable coupling therebetween;

FIG. 6 is a view similar to FIG. 1 but without the reverse sharpening mechanism in operable connection; and FIG. 7 is a fragmentary, detailed cross-sectional view on line 7—7 of FIG. 6.

Figure 1:
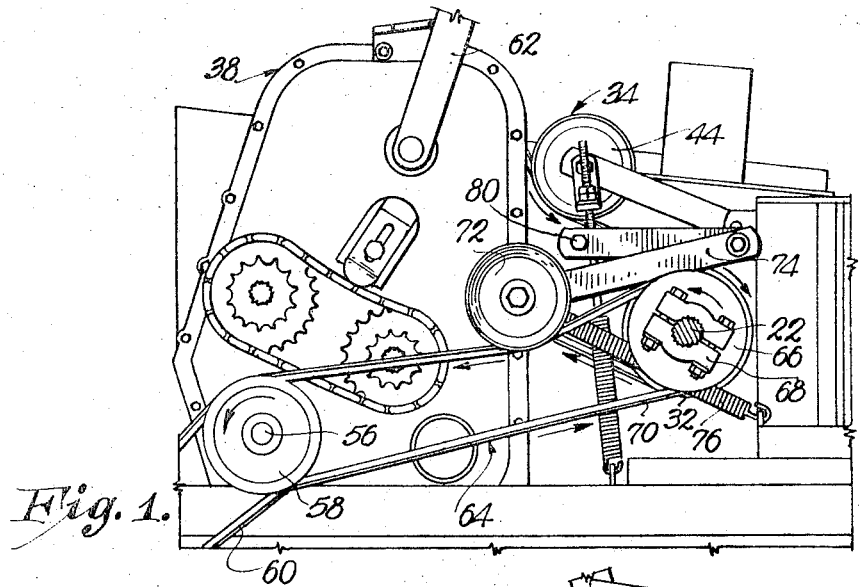
FIG. 1 is a side elevational view of a gear transmission showing the mechanism for reverse sharpening in operation.

Forage harvesters of the well-known types are provided with a crop cutting sickle behind which are included gathering chains for directing the cut crop to two pairs of rolls 10, 12, 14 and 16 that feed the crop to a chopper rotor 18 having a number of spiral blades or knives 20.

Rotor 18 is normally driven directly from a power shaft 22 through a releasable coupling 24 which connects shaft 22 with rotor shaft 26. Coupling 24 includes a plate 28, joined with shaft 22 through a universal joint 30, and a pulley 32 secured to plate 28 by a number of shear bolts 33. Pulley 32, rigid to shaft 26, is part of a drive 34 in the nature of a belt and pulley unit from shaft 22 to the input shaft 36 of a reversible transmission 38. Drive 34 includes also a pulley 40, rigid to shaft 36, a belt 42 between pulleys 32 and 40, and a spring-loaded idler 44 for holding belt 42 taut.

Figure 2:
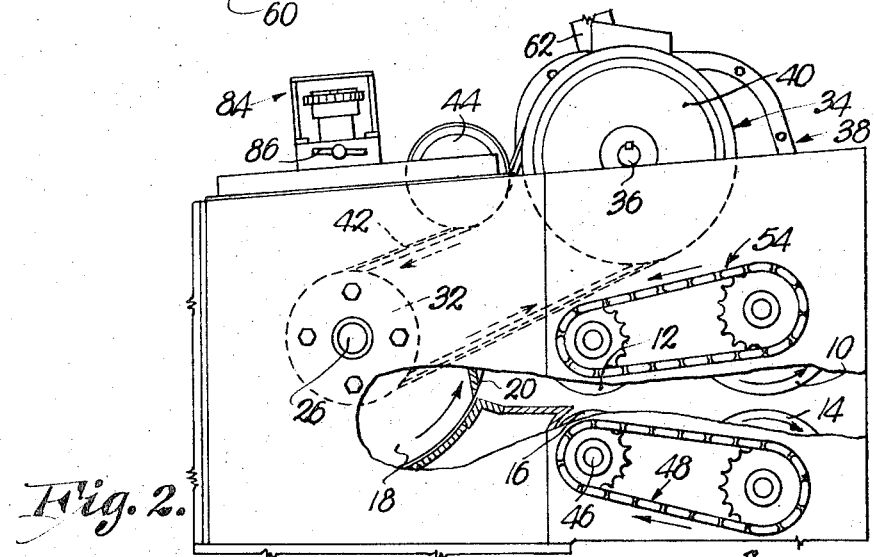
FIG. 2 is an elevational view showing the opposite side of the transmission and illustrating the rotor operating in reverse.
Figure 3:
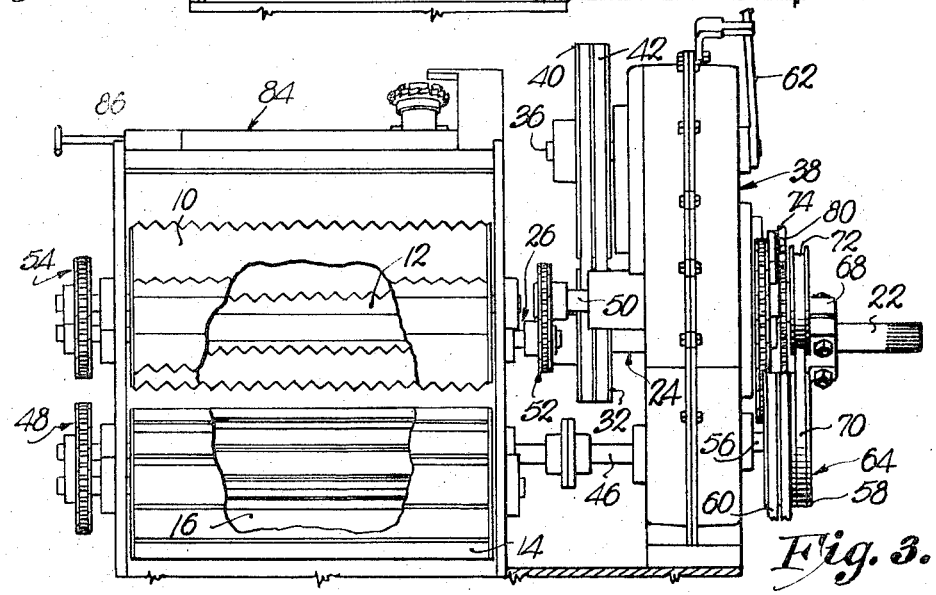
FIG. 3 is a front view of the transmission and the feeder rolls as shown in FIGS. 1 and 2.

The gear transmission 38 has an output shaft 46 that is directly coupled to roll 16, the latter of which drives roll 14 by a chain and sprocket wheel assembly 48. A second output shaft 50 from transmission 38 drives roll 12 through a chain and sprocket wheel unit 52 and the roll 10 is driven from roll 12 by a chain and sprocket wheel unit 54. A third output shaft 56 from transmission 38 has a multiple groove pulley 58 which, through belt 60, drives the aforementioned sickle and gathering chains. Shafts 46, 50 and 56 are driven by shaft 36 in reverse upon movement of reversing lever 62 of transmission 38 to the position shown in FIGS. 1–4.

A belt and pulley assembly 64, used upon removal of bolts 33 to release coupling 24, includes the pulley 58, a pulley 66 mounted on shaft 22 by a clamp 68, a removable belt 70 interconnecting pulleys 58 and 66 and a spring-loaded idler 72 for holding belt 70 taut. When not in use, swingable idler arm 74 is held up against the tension of its spring 76 by a bolt 78 whose head 80 is in hooked relation to arm 74 as shown in FIG. 7. When arm 74 is released, bolt 78 gravitates out of the way along its inclined, tubular support 82.

Sharpener 84 forms no part of the present invention; suffice it then to indicate that upon manual reciprocation of rod 86, a sharpening stone (not shown) is shifted longitudinally of the rotor 18 and as such shifting causes the stone to rotate, the cutting edges of blades 20 are sharpened thereby during rotation of rotor 18.

Such sharpening is more effectual if rotor 18 is rotated in reverse. Hence, with bolts 33 removed and belt 70 in place, shaft 22 rotates output shaft 56 in its normal, anticlockwise direction (compare FIGS. 1 and 6), but no longer rotates rotor 18 directly. Instead, with lever 62 in reverse, shaft 56 rotates shaft 36 in reverse. Shaft 36 then drives rotor 18 in reverse through drive 34 during the sharpening operation. In FIG. 6, the lever 62 is shown in its forward position and drive 34 is shown in its normal direction of operation when the belt 70 is removed and the bolts 33 replaced. The neutral position of the lever 62 (not shown) is intermediate its forward position (FIG. 6) and its reverse position (FIGS. 1–4).

Having thus described the invention, what is claimed as new and desired to be covered by Letters Patent is:

1. In combination,
    a power shaft;
    a rotor;
    a releasable coupling between the power shaft and the rotor for rotating the latter in one direction during rotation of the power shaft;
    a reversible transmission having an input shaft and an output shaft;
    a drive between the rotor and said input shaft for rotating the latter during rotation of the rotor in said one direction; and
    structure for operably connecting the power shaft with said output shaft when said coupling is released and said transmission is reversed for driving the rotor in the opposite direction from the input shaft and said drive.

2. The invention as claimed in claim 1 wherein said rotor is provided with a driven shaft and said coupling is between the driven shaft and the power shaft.

3. The invention as claimed in claim 1 wherein said rotor is provided with a driven shaft, wherein said drive includes a rotatable member rigid to the driven shaft and wherein said coupling is between the member and the power shaft.

4. The invention as claimed in claim 1 wherein said structure comprises a belt and pulley assembly having a removable belt.

5. In combination, a reversible transmission having an input shaft and an output shaft normally rotated in one direction by the input shaft but in the opposite direction thereby when the transmission is reversed, a power shaft, a rotor, and apparatus for rotating the rotor either forwardly or rearwardly from said power shaft without changing the direction of rotation of the latter, said apparatus comprising:

a releasable coupling between the power shaft and the rotor for normally rotating the latter forwardly;

a drive between the rotor and said input shaft for normally rotating the output shaft in said one direction; and structure for operably connecting the power shaft with said output shaft when said coupling is released and said transmission is reversed for rotating the output shaft in said one direction and thereby rotating the rotor in reverse from said input shaft and said drive.

6. The invention of claim 5 wherein said drive is a belt and pulley unit between the rotor and the input shaft and wherein said structure is a belt and pulley assembly between the power shaft and the output shaft, the belt of said assembly being removable.

7. The invention of claim 6 wherein said rotor has a shaft and said unit has a pulley rigid to the rotor shaft, said coupling being between said power shaft and said pulley on the rotor shaft.

8. The invention of claim 6 wherein said unit and said assembly are each provided with a spring-loaded idler for maintaining the belts thereof taut.

9. The invention of claim 6 wherein is provided a spring-loaded idler for maintaining the removable belt taut and releasable means for holding the idler in an inoperable position when the removable belt is removed.

* * * * *